(12) United States Patent
McComas

(10) Patent No.: US 7,020,048 B2
(45) Date of Patent: Mar. 28, 2006

(54) USER SELECTABLE DISPLAY MODES FOR A VEHICLE MP3 COMPACT DISC PLAYER

(75) Inventor: Kathryn A. McComas, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 31 days.

(21) Appl. No.: 10/409,723

(22) Filed: Apr. 9, 2003

(65) Prior Publication Data
US 2004/0202059 A1    Oct. 14, 2004

(51) Int. Cl.
H04B 1/20    (2006.01)

(52) U.S. Cl. ............................... 369/6; 369/7; 715/813

(58) Field of Classification Search .................... 369/6, 369/7, 2, 30.27, 30.04, 30.07, 30.08; 345/716; 715/813, 810, 811, 812
See application file for complete search history.

(56) References Cited

U.S. PATENT DOCUMENTS

| | | | |
|---|---|---|---|
| 6,292,440 B1* | 9/2001 | Lee ............................... 369/7 |
| 6,301,638 B1* | 10/2001 | Suzuki et al. ................. 711/112 |
| 6,587,404 B1* | 7/2003 | Keller et al. ............. 369/30.06 |
| 6,700,839 B1* | 3/2004 | Auflick et al. ........... 369/30.08 |
| 6,791,481 B1* | 9/2004 | Altare et al. .................... 369/7 |
| 6,889,039 B1* | 5/2005 | Osman ..................... 455/412.1 |
| 2002/0101791 A1* | 8/2002 | Ito ........................... 369/30.09 |
| 2002/0140720 A1* | 10/2002 | Uno et al. .................... 345/716 |
| 2003/0147628 A1* | 8/2003 | Seo et al. ...................... 386/69 |
| 2003/0158737 A1* | 8/2003 | Csicsatka ..................... 704/273 |
| 2003/0221541 A1* | 12/2003 | Platt ............................. 84/609 |

OTHER PUBLICATIONS

Delphi: "Press Kits & Photos Consumer Electronics Show (CES)—Jan. 3-11, 2002" Online! Jun. 3, 2002. XP002283063.
Delphi: "Delphi's Digital Radio Technology Brings Crystal-Clear Sound to Vehicles" Online Jan. 7, 2003, XP002283064.
Delphi: "Delphi HD Radio" Online! 2003, XP002283065.
Blaupunkt: "San Jose MP41: High-Power FM/AM/CD/MP3 Receiver with Detachable Face", Parts Express, Online! Aug. 23, 2001. XP002283705.
Pioneer: "Operation manual DEH-P3630MP, English version", Support—Online Manuals, Online! 2002, XP002283706.

* cited by examiner

Primary Examiner—Tan Dinh
(74) Attorney, Agent, or Firm—Stefan V. Chmielewski

(57) ABSTRACT

A vehicle audio system is provided that includes an audio receiver having a radio tuner and a random access media reader adapted for accessing audio data files such as those stored on a compact disc. The audio system includes a display having a plurality of display formats for displaying a label associated with an audio data file, and a display switch having a first mode operable for shifting the display from one of the plurality of display formats to another of the plurality of display formats, a second mode operable for setting the default display format to another display format, and a third mode operable for initiating sequential display of a plurality of display pages to displaying the label.

17 Claims, 14 Drawing Sheets

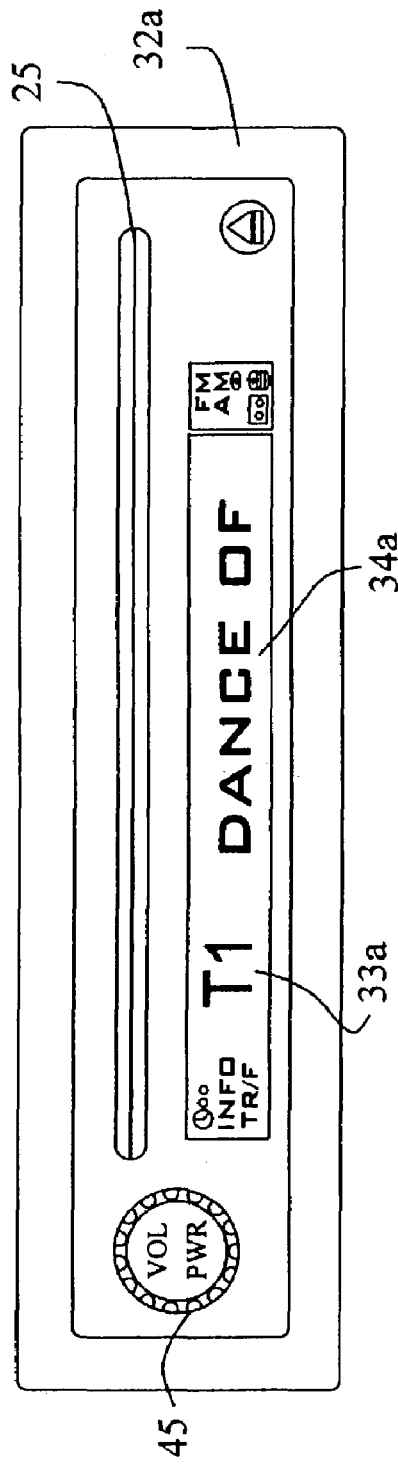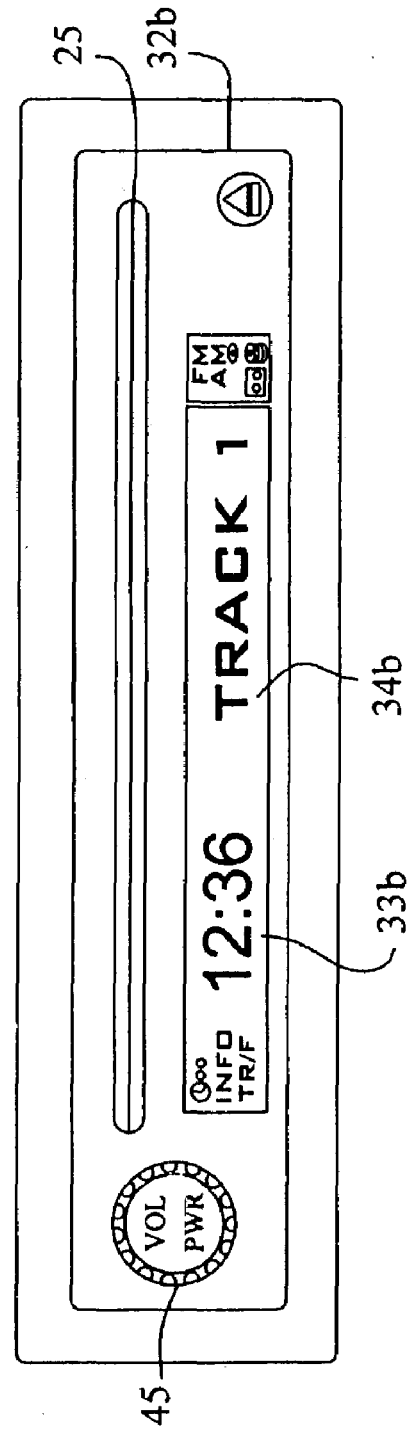
FIG. 4A
FIG. 4B

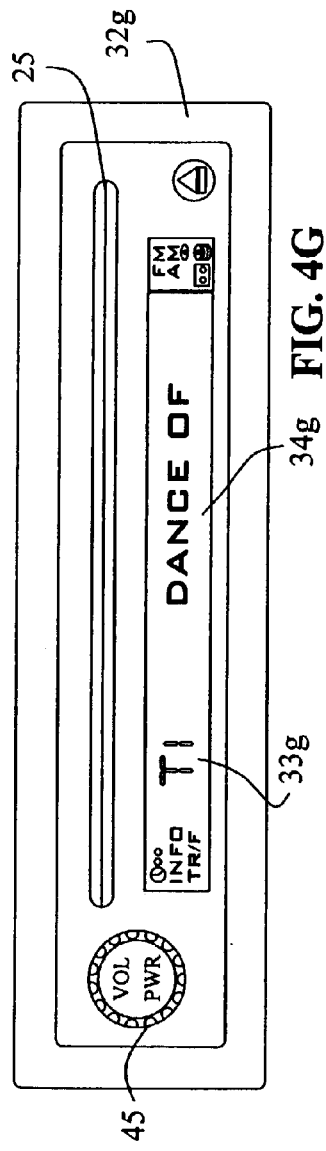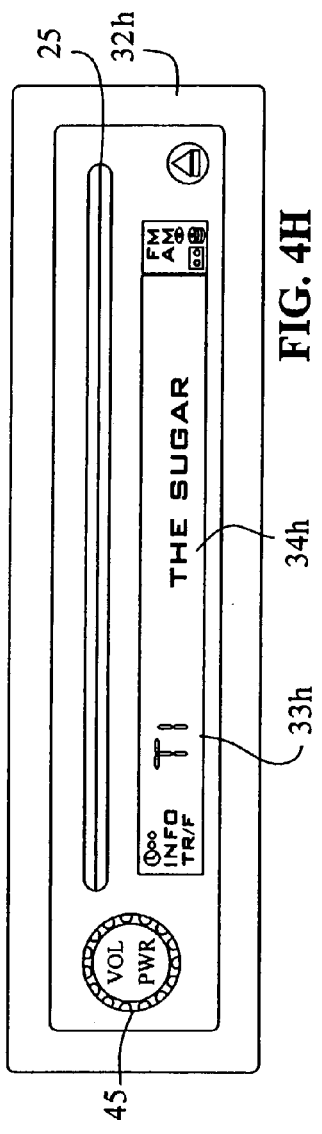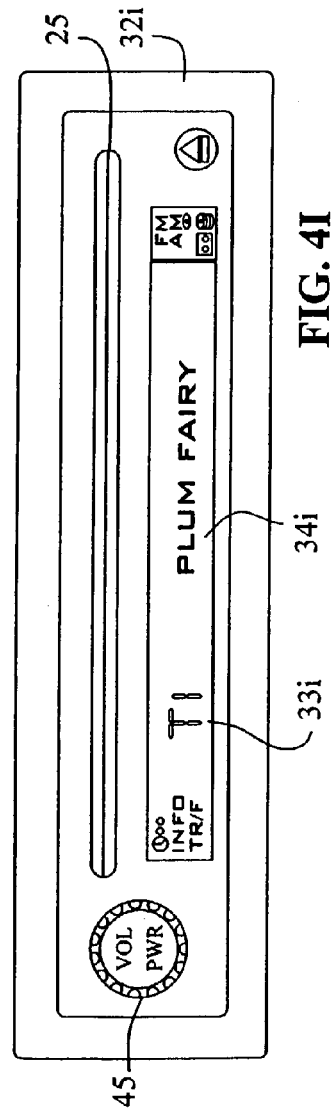

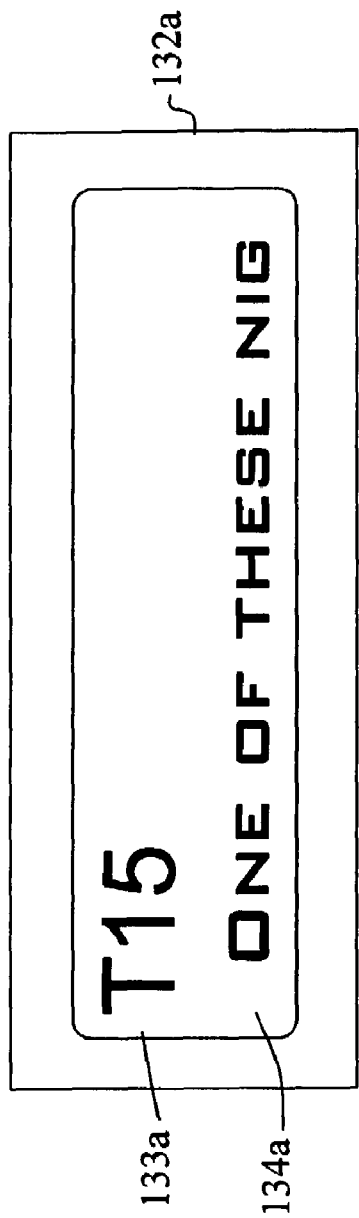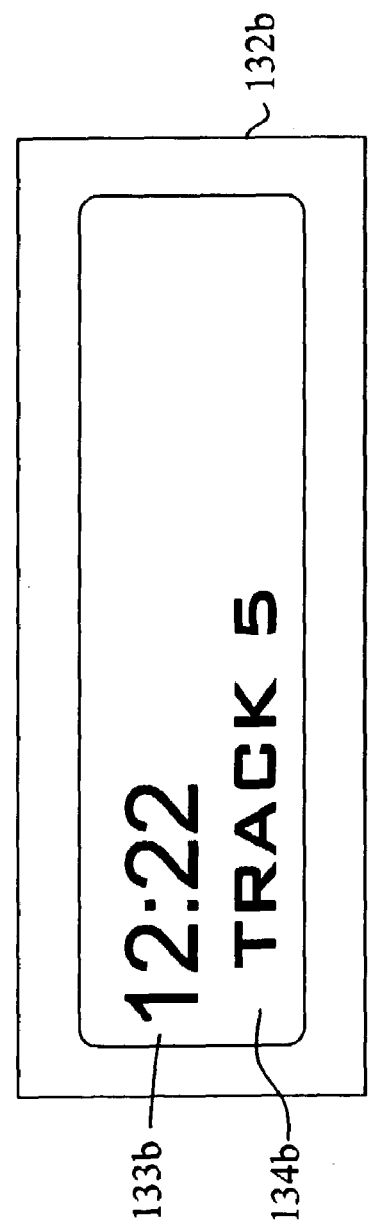
FIG. 6A
FIG. 6B

USER SELECTABLE DISPLAY MODES FOR A VEHICLE MP3 COMPACT DISC PLAYER

TECHNICAL BACKGROUND

The present invention relates to a vehicle audio system having a compact disc player.

BACKGROUND OF THE INVENTION

Audio systems having compact disc (CD) players have become commonplace in vehicles. CDs generally have individual "tracks" or digital audio data files that can be processed for playback of a recording stored in the data file.

Audio CDs conventionally include up to fifteen tracks available for playback. An audio system user may select from the various tracks by using pushbuttons on the audio system user interface. Viewing a display of the track name or number and using the pushbuttons to step between tracks is generally sufficient to select a user's track of choice from the low number of tracks available on a conventional audio CD. However, the introduction of compressed audio data file formats, such as MP3, on a data CD now allows such data CDs to have 200 or more different tracks.

Audio data file formats may also contain display and searching information stored in each audio data file in addition to the compressed sound recording. For example, MP3 files may include ID3 tags which contain informational text associated with the audio data file, such as track or song name. However, even with such information, using pushbuttons can be extremely cumbersome for a user to locate a particular desired audio data file for playback from among over 200 tracks.

In addition to supporting a growing number of audio data files on a single CD, data CD formats generally organize the audio data files into groups stored in folders or playlists. For example., audio data files may be grouped into folders that each relate to a particular artist, album, genre, or other characteristic of the particular recordings stored in the audio data files stored in each folder. Additionally, playlists are used to organize a group of audio data files into a preferred playback order.

SUMMARY OF THE INVENTION

The present invention addresses some of the above-noted limitations of audio systems, particularly vehicle audio systems, by providing an audio system including an audio receiver having a radio tuner, a random access media reader adapted to access audio data files stored on removable random access media, such as an audio or data CD, a processor, a display having a plurality of display formats, and a display switch operable for changing the display from one of the plurality of display formats to another one of the plurality of display formats.

The user interface includes a display and various user input devices. The display is capable of displaying information related to a selected audio data file, such as the track number and the track name or filename using the plurality of display formats. The user input devices include a DISPLAY switch that is selectively operable in three modes.

The first mode is operable for changing the display from one of the plurality of display formats to another one of the plurality of display formats. The second mode of the display switch is operable for setting a default display format to one of the plurality of display formats. The third mode is operable for initiating sequential display of a plurality of display pages associated with displaying a track name or filename that is longer than a single display page.

When the random access media reader is in use, a TUNE switch is automatically operable to step between the audio data files. Clockwise rotation of the TUNE switch will repeatedly step the selection to the next audio data file, and counterclockwise rotation of the TUNE switch will repeatedly step the selection to the previous audio data file. As each audio data file is selected, information related to the selected audio data file is displayed. Upon cessation of movement of the TUNE switch for greater than a preset period of time, playback of the selected audio data file begins.

The audio data files available for playback are generally stored on a random access media (such as a data CD) in groups, such as playlists and folders. Specifically, the media may include several playlists, each playlist including a plurality of audio data files or, more typically, audio data file pointers. Each folder may include a plurality of audio data files as well as subfolders.

The user interface also includes a FOLDER UP switch and a FOLDER DOWN switch for stepping the selection between the various folders and playlists. The FOLDER UP and FOLDER DOWN switches first step the selection between the available playlists, and then step the selection between the available folders.

In one form of the invention, an audio system includes an audio receiver; a processor coupled to the audio receiver; a random access media reader coupled to the processor, the processor having software enabling access to audio data files, folders, and playlists on a removable random access media; a display having a plurality of display formats actuateable by the software, each display format displaying a label associated with an audio data file; and a display switch coupled to the processor and having a first mode in which the display switch causes the software to change the display from one of the plurality of display formats to another one of the plurality of display formats.

In another form of the invention, a method is provided for changing the display of audio data file information in an audio system including an audio receiver having a radio tuner, a random access media reader adapted to access the audio data files, and a user interface including the display, the method including the steps of displaying in a display format on the display information associated with the audio data file, receiving a user input from the user interface, and altering the display format of information associated with the audio data file upon receiving the user input.

In yet another form of the invention, an audio system is provided including an audio receiver having a radio tuner, a random access media reader capable of accessing audio data files, a processor coupling the audio data player and the random access media reader, a user interface coupled to the processor and having a switch in a display, and software enabling the processor to display on the display information associated with the audio data file using one of a plurality of display formats, receive a first signal from the switch, and upon receiving the first signal, change the display of information from one of the plurality of display formats to another of the plurality of display formats.

Advantageously, the present invention provides an audio system including a display having a plurality of display formats for displaying a label associated with an audio data file, and a display switch having a number of modes operable for altering the display of information associated with the audio data files.

BRIEF DESCRIPTION OF THE DRAWINGS

The present invention will now be described, by way of example, with reference to the accompanying drawings, in which:

FIGS. 4A–4I are plan views of the display portion of the user interface shown in FIG. 3;

FIGS. 6A–6I are plan views of the display portion of the user interface shown in FIG. 5;

Figure 1:
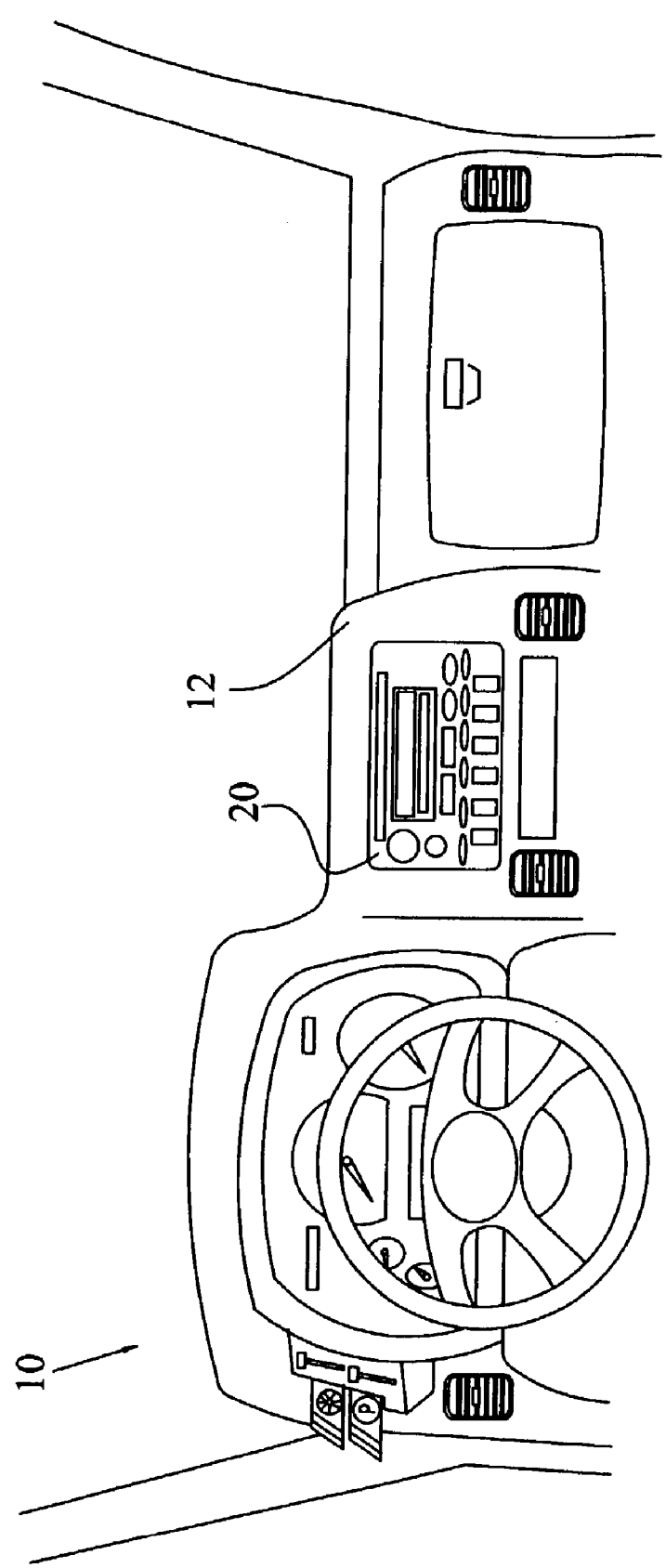
FIG. 1 is a perspective view of an exemplary embodiment of the audio system according to the present invention and installed in the dash of a vehicle.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

Figure 2:
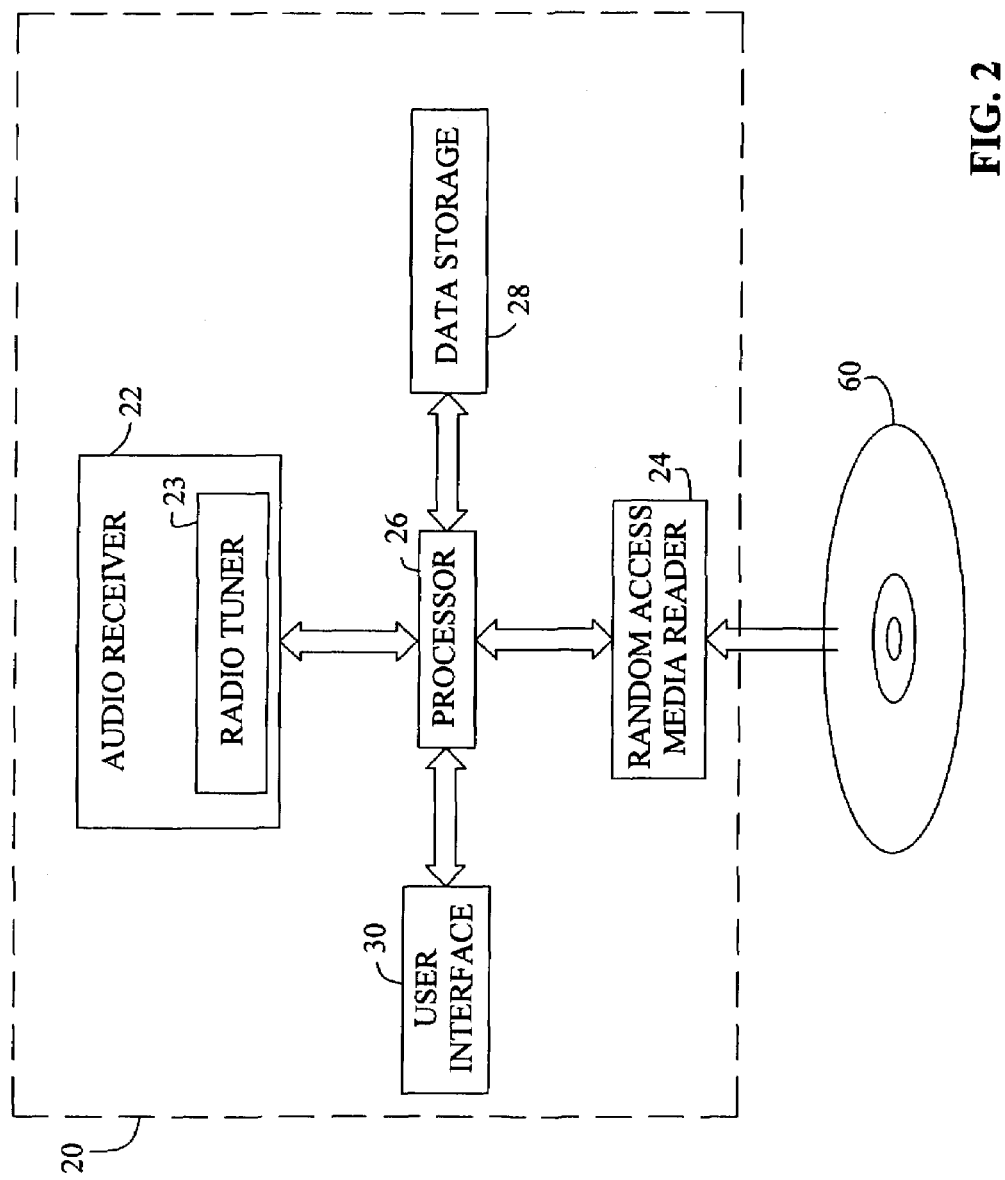
FIG. 2 is a schematic block diagram of the audio system shown in FIG. 1.

FIG. 1 shows a portion of the interior passenger compartment of vehicle 10 having an exemplary embodiment of audio system 20 installed in dash 12. Referring to FIG. 2, audio system 20 may include audio receiver 22, radio tuner 23, random access media reader 24, data storage 28, and user interface 30 coupled to processor 26. Random access media reader 24 is capable of releasably receiving random access media, such as audio or data CD 60, for example.

Processor 26 may be a single processor, multiple processors, a component of random access media reader 24, or a component of audio receiver 22. Similarly, radio tuner 23 may be a part of audio receiver 22 or may be a separate component coupled to audio receiver 22.

Random access media reader 24 is adapted for accessing audio data files stored on CD 60. CD 60 may be a standard audio CD, such as those containing CDA format files, or a data CD, such as those having compressed audio data files, for example, MP3 format files. Other random access media and readers may also be used, for example, DVD, mini-disc, PCMCIA, etc.

Figure 3:
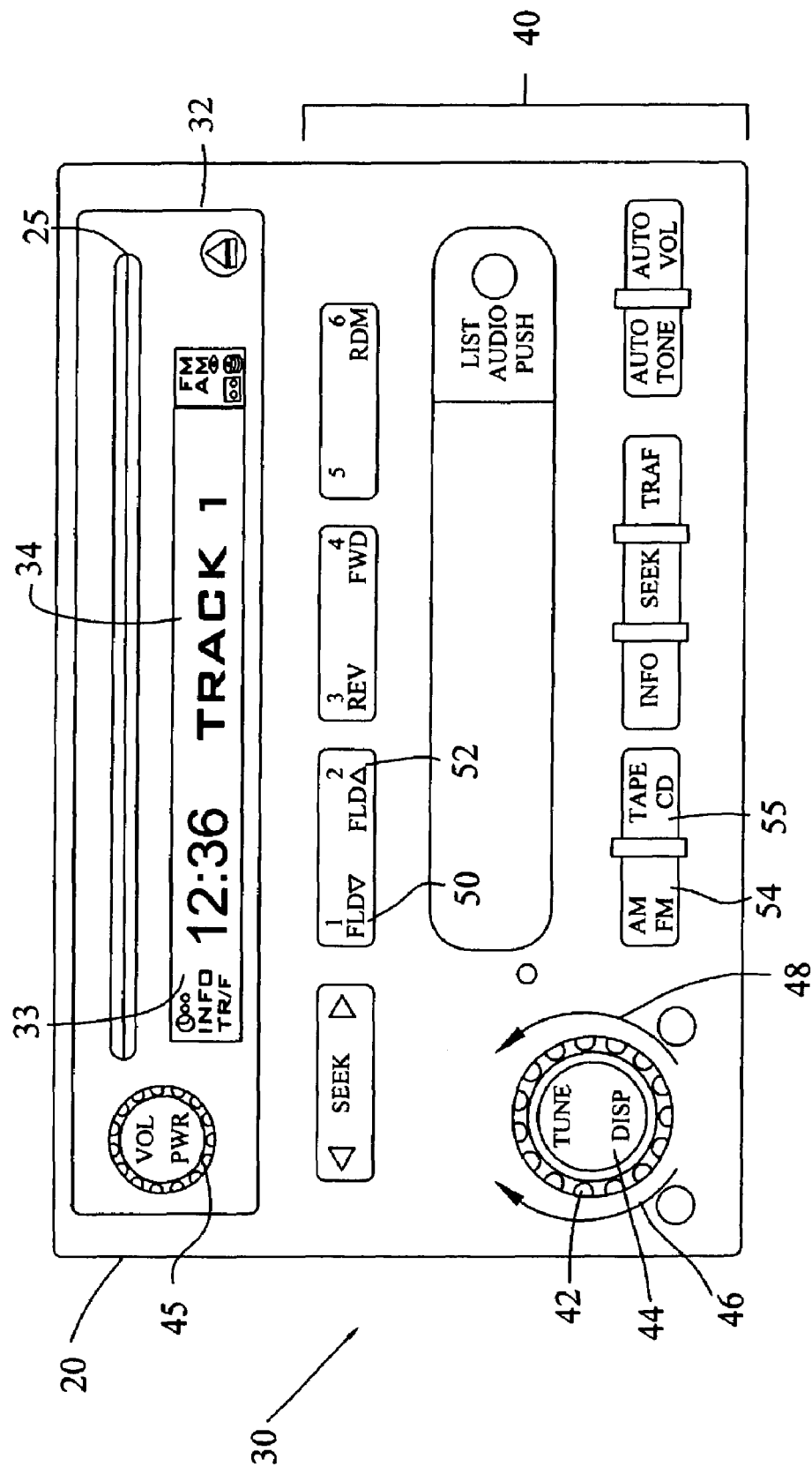
FIG. 3 is a plan view of a first exemplary embodiment of the user interface of the audio system shown in FIG. 2.

FIG. 3 shows a first exemplary embodiment of user interface 30 of audio system 20. User interface 30 generally includes CD receiving slot 25, display 32, and various user input devices 40. Display 32 may include first display area 33 and second display area 34. Input devices 40 include TUNE switch 42, DISPLAY switch 44, VOLUME switch 45, FOLDER DOWN pushbutton 50, FOLDER UP pushbutton 52, RADIO pushbutton 54, and CD pushbutton 55.

Figure 5:
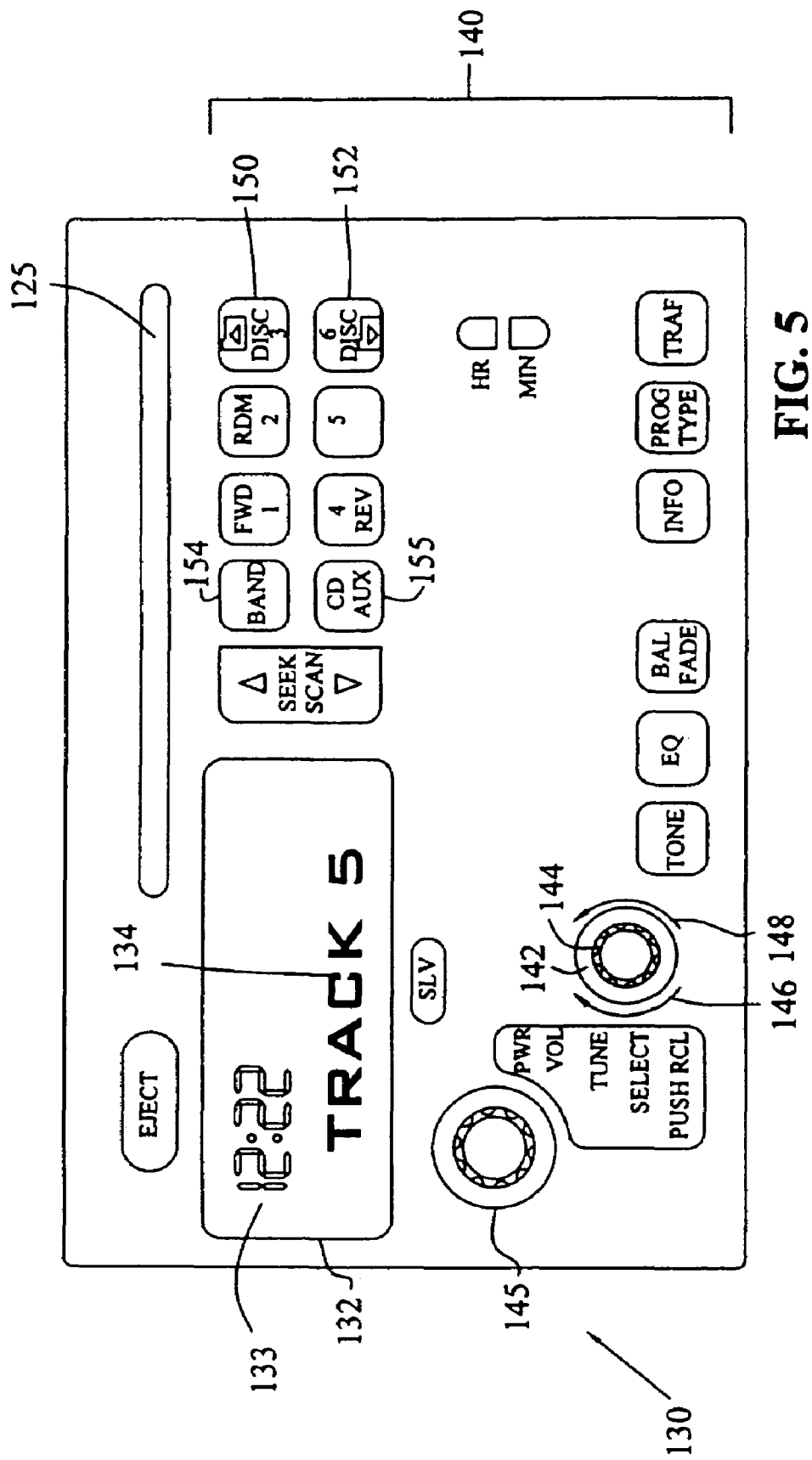
FIG. 5 is a plan view of a second exemplary embodiment of the user interface of the audio system shown in FIG. 2.

FIG. 5 shows a second exemplary embodiment of user interface 130 of audio system 20. User interface 130 generally includes CD receiving slot 125, display 132, and user input devices 140. Display 132 may include first display area 133 and second display area 134. Input devices 140 include TUNE switch 142, RCL switch 144, VOLUME switch 145, FOLDER UP pushbutton 150, FOLDER DOWN pushbutton 152, RADIO pushbutton 154, and CD pushbutton 155.

Audio system 20 has two modes of operation. A first mode, selected by actuating RADIO pushbutton 54, 154 which activates radio tuner 23, deactivates random access media reader 24, and sets TUNE switch 42, 142 to the first mode of operation. In the first mode, TUNE switch 42, 142 is operable for tuning radio tuner 23, which then provides an audio signal to audio receiver 22. A second mode of operation is selected by actuating CD pushbutton 55, 155 and is operable for activating random access media reader 24, deactivating radio tuner 23, and setting TUNE switch 42, 142 to the second mode of operation. In the second mode, TUNE switch 42, 142 is operable for rapidly stepping between available audio data files and initiating playback of a selected audio data file.

Upon activation of random access media reader 24 by pressing CD pushbutton 55, 155, or other suitable activation method, display 32, 132 will display information relating to the audio data files available on CD 60 for playback by audio system 20. For example, displays 32, 132 display information regarding the currently selected audio data file or "track."

Referring to FIG. 4A, if CD 60 is a data CD, such as those having files with an MP3 format, display 32a may display the letter T followed by a track number in display area 33a and a label, such as a filename or first portion of a filename in display area 34a. For example, as shown in FIG. 4A, the first available audio data file on CD 60 is track 1, displayed as "T1" in first display area 33a, and has a first portion of the filename of track 1, "DANCE OF", shown in second display area 34a. If the filename includes an extension, such as ".mp3", only the portion of the filename preceding the extension will be displayed. Alternatively, second display area 34a may be used to display a track name, such as is stored in an ID3 tag field in an MP3 audio data file. As shown in FIG. 6A, display 132a of the second exemplary embodiment of user interface 130 also shows a track number in first display area 133a and filename or track name in second display area 134a.

Referring to FIG. 4B, if CD 60 is a standard audio CD, such as those having CDA format audio data files, display 32b includes the time of day in first display area 33b and the word "track" followed by the track number of the currently selected audio data file in second display area 34b. Similarly, as shown in FIG. 6B, the second exemplary embodiment of user interface 130 includes display area 132b showing the time of day in first display area 133b and the track number in second display area 133b.

Figure 4C:
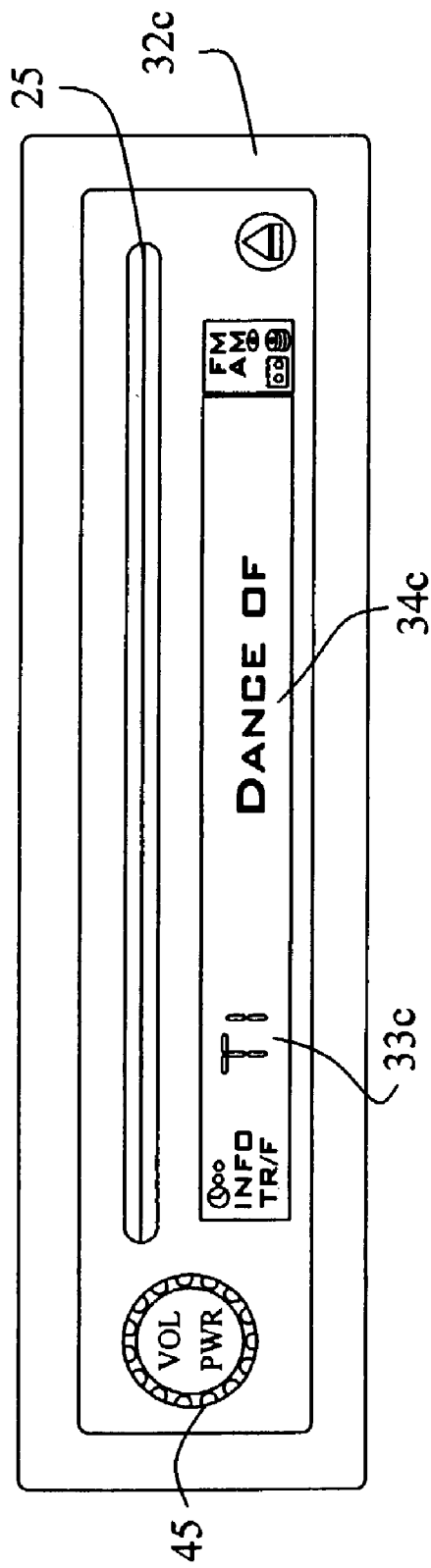
Figure 6C:
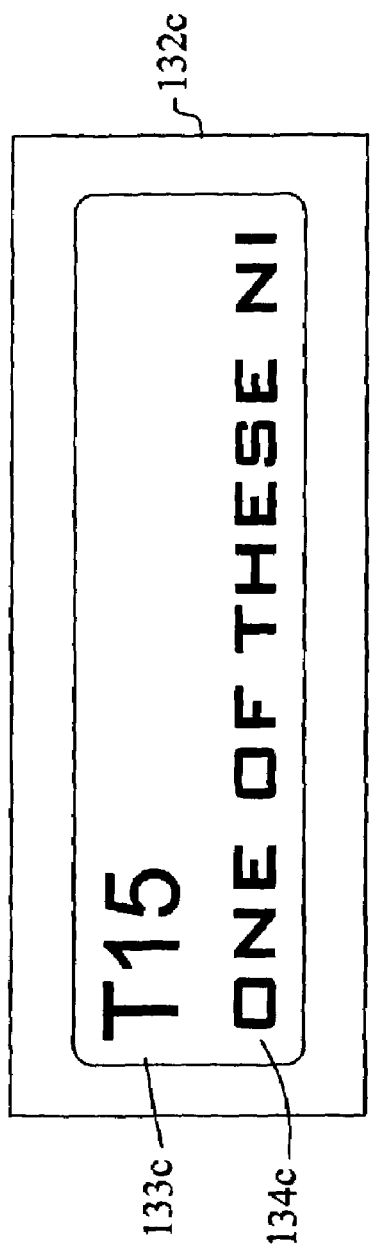
Figure 6D:
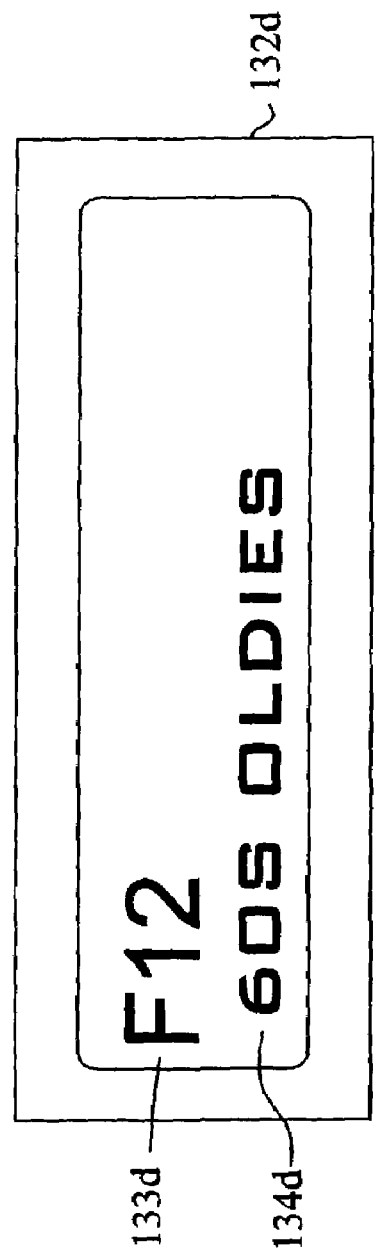
Figure 6E:
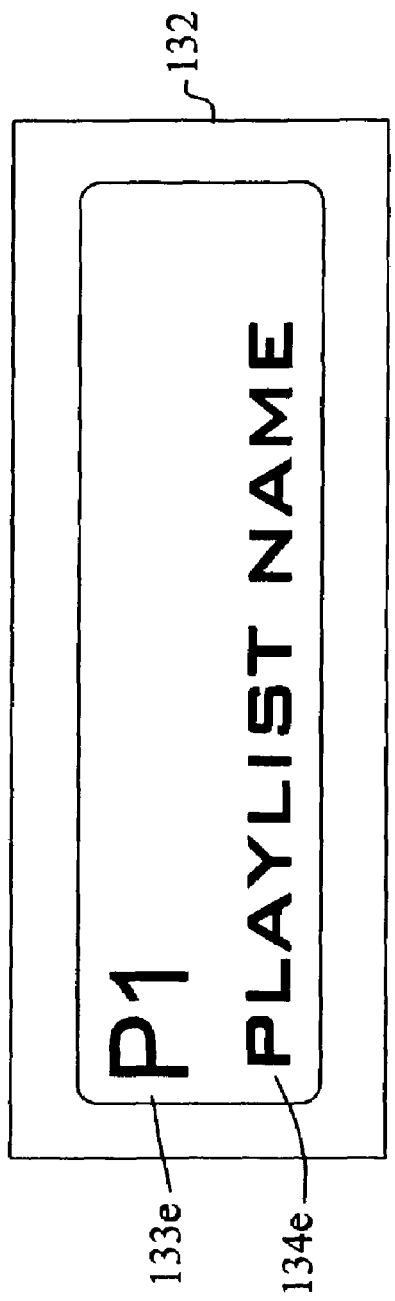

Referring to FIGS. 4C–4F and 6C–6F, a plurality of display formats are shown. In FIGS. 4C and 6C, the display format for display 32C, 132C includes the track number in first display area 33c, 133c and filename or track name in second display area 34c, 134c.

The display format shown in FIGS. 4D–4E and 6D–6E includes the folder or playlist number in first display area 33d/e, 133d/e of display 32d/e, 132d/e, and the folder or playlist name in second display area 34d/e, 134d/e of display 32d/e, 132d/e.

Figure 4D:
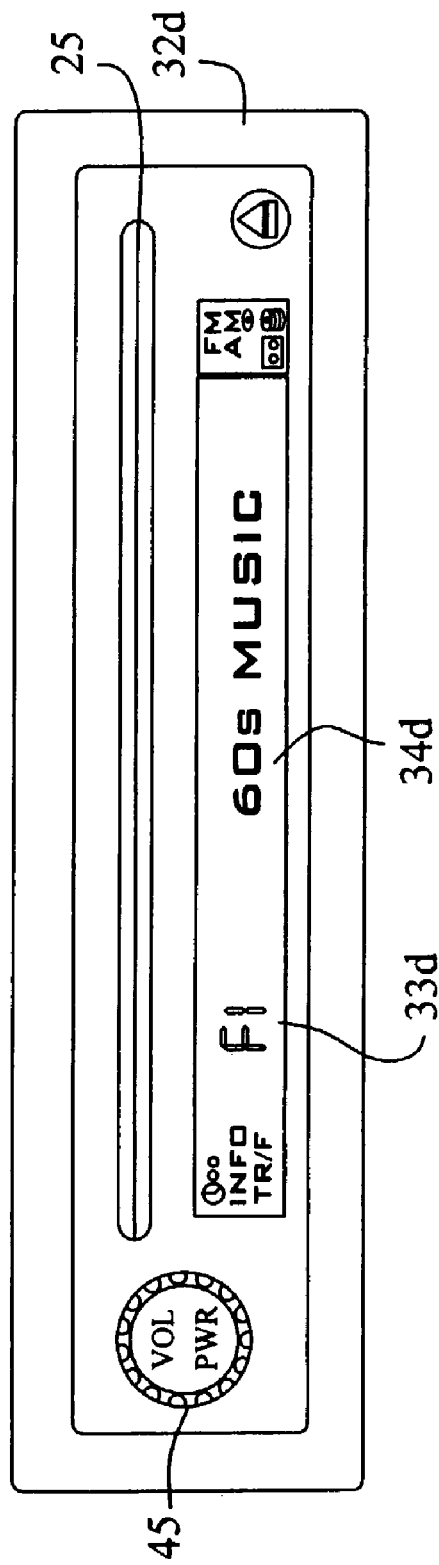
Figure 4E:
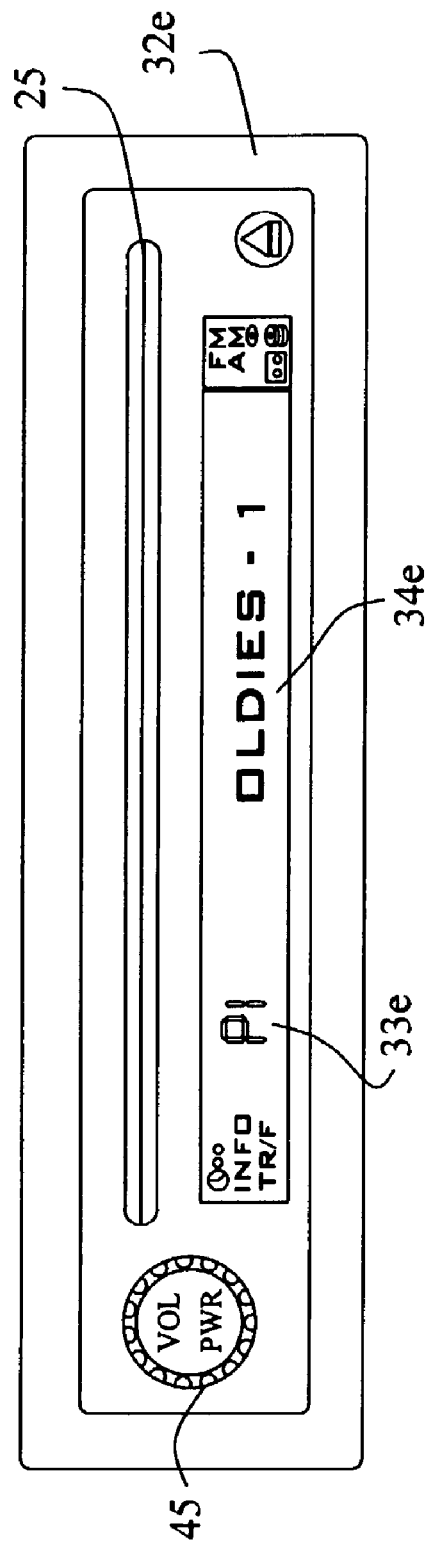
Figure 4F:
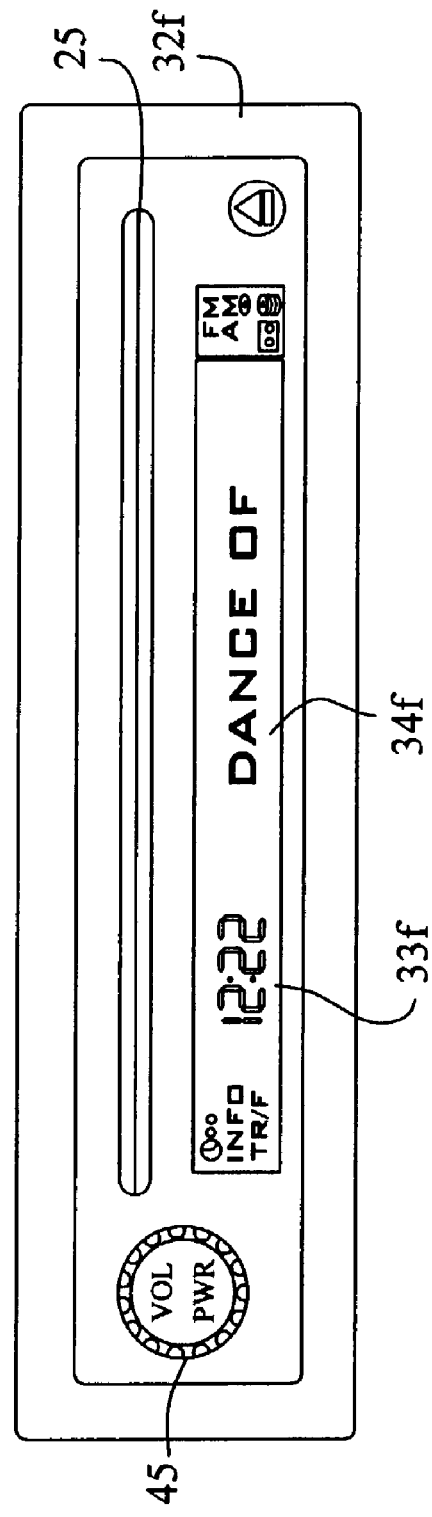
Figure 6F:
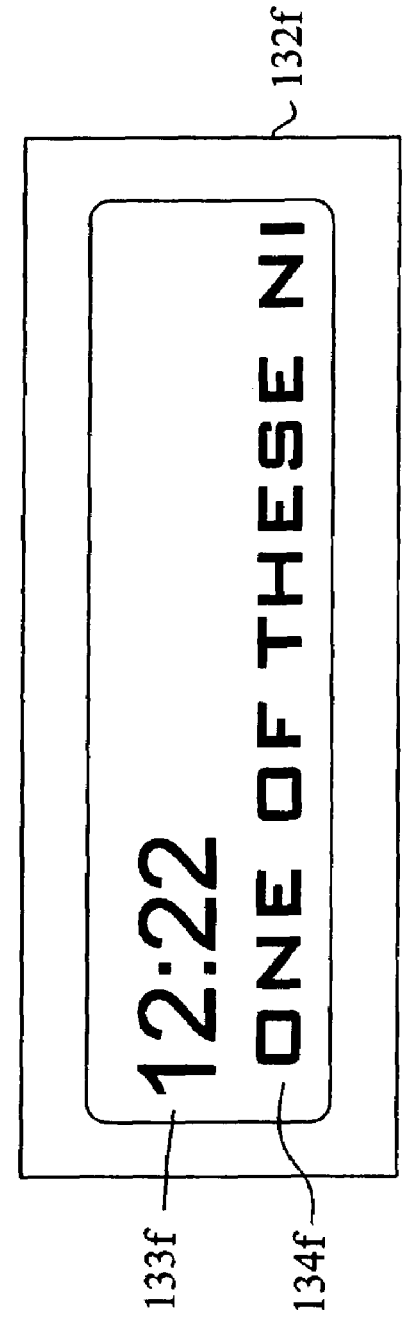

Referring to FIGS. 4F and 6F, another display format includes the time of day shown in first display area 33f, 133f of display 32f, 132f, and the filename or track name shown in second display area 34f, 134f of display 32f, 132f.

The display formats shown in FIGS. 4A–4I and 6A–6I are exemplary only. Other display formats displaying the same or other information or labels related to the audio data files may also be used.

Referring again to FIG. 3, when random access media reader 24 has been selected by actuating CD pushbutton 55, DISPLAY switch 44 is operable in several modes for changing the display format of display 32.

A first mode of display switch 44 is active when two conditions are satisfied. First, the label to be displayed in second display area 34 fits within the limited numbers of characters available in second display area 34. Second, the user actuates display switch 44 for less than a preset duration of time, for example, 2 seconds. When the conditions are satisfied for the first mode of operation, the display format of display 32 will be stepped to the next one of the plurality of display formats. For example, if the display format shown in FIG. 4D is the current display format, and the user presses display switch 44 for less than 2 seconds, and, as shown, the length of the label displayed fits within display area 34d, then the display format will be stepped to the next available display format, for example, the time of day and label format of FIG. 4F. Additional actuations of display switch 44 will likewise step the display format to the next available format if the first and second conditions are met.

A second mode of display switch 44 is operable when the user actuates display switch 44 for at least a preset duration of time, for example, greater than 2 seconds. The second mode of operation of display switch 44 will reset a default display format to the currently displayed format. The default display format is the format that processor 26 will first use to display information regarding a selected audio data file. Thus, if the display format shown in FIG. 4C has been stored as the default display format, for example, this format will be displayed upon power-up, even if the display format shown in FIG. 4F had last been selected by the user via the first mode of operation of display switch 44.

A third mode of operation of display switch 44 is operable when two conditions are satisfied. First, there are a plurality of display pages associated with the current audio data file, for example, as shown in FIG. 4G, the label displayed in second display area 34g is longer than the available display area characters. Thus, as shown in FIGS. 4G–4I, a plurality of display pages are associated with the displayed label. Second, display switch 44 is actuated by the user for less than a preset duration of time, for example, less than 2 seconds. The third mode of operation of display switch 44 will initiate sequencing of the plurality of display pages associated with the audio data file. For example, if FIG. 4G is the current display, the third mode of display switch 44 will sequentially display FIG. 4H followed by FIG. 4I, and again returning to FIG. 4G. Each display page may be displayed for a preset time, for example, 0.5 seconds. Alternatively, a different form of sequencing display pages to display the entire label of second display area 34 may be used, for example, scrolling the label across second display area 34.

Actuating DISPLAY pushbutton 44 a second time for less than the preset duration and while processor 26 is sequencing the plurality of display pages, will activate the first mode of DISPLAY pushbutton 44, thereby stepping display 32 to the next one of the plurality of display formats.

Figure 6G:
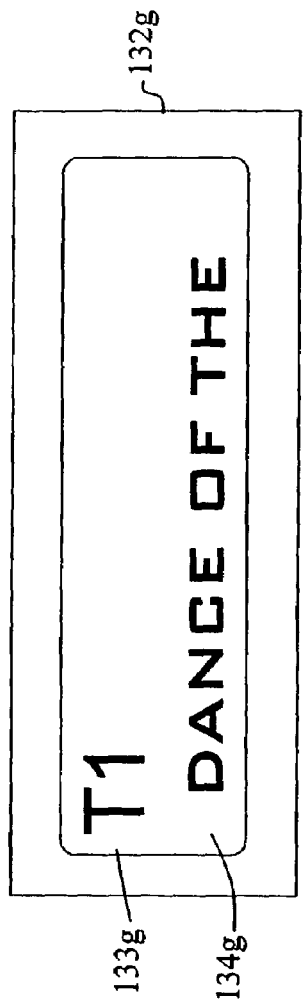
Figure 6H:
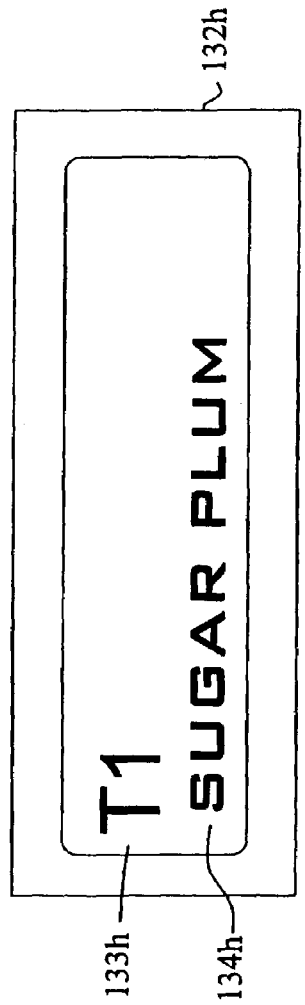
Figure 6I:
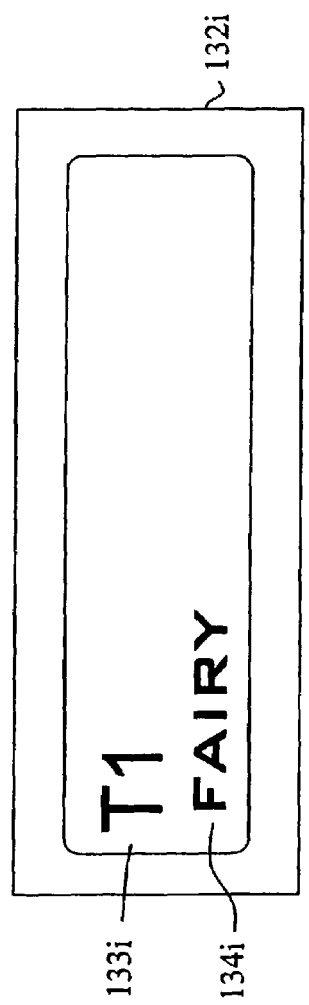

Referring to FIG. 5, the second exemplary embodiment of user interface 130 includes RECALL switch 144, which may function to change the display formats of display 132, in the same fashion that display switch 44 functioned to change the display formats of display 32. A plurality of display formats, shown in FIGS. 6A–6F, may also be available for user interface 130. In addition, as shown in FIGS. 6G–6I, a plurality of display pages may be associated with an audio data file in order to display a label in second display area 134 which does not fit in the available number of characters of second display area 134.

The present invention also includes a method for changing the display format of display 32, 132 in audio system 20. In the exemplary embodiment, the method is executed by software in processor 26. However, the method may alternatively be implemented by the hardware design of the electronics or a combination of hardware and software.

Figure 8:
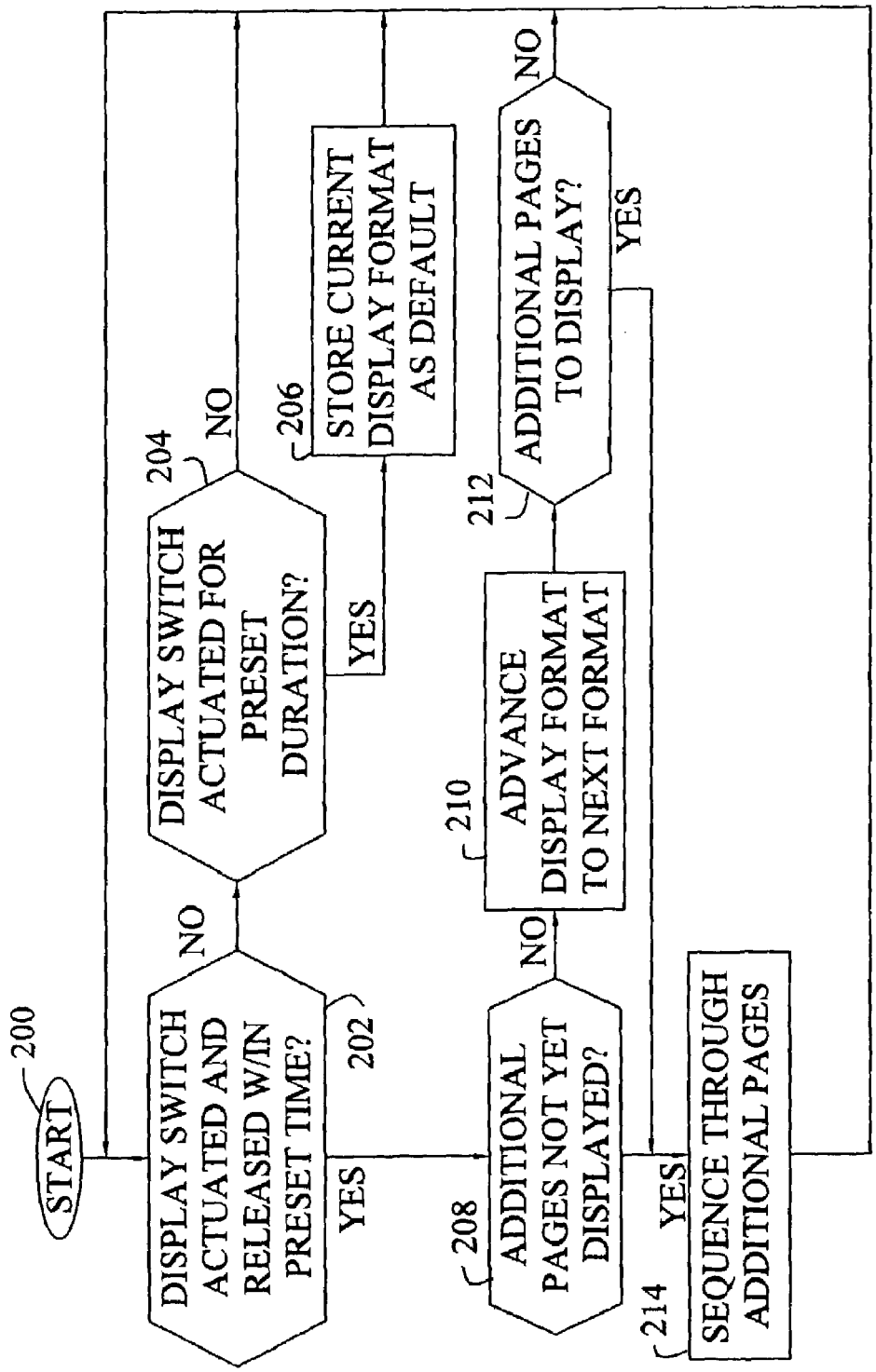
FIG. 8 is a flowchart diagram illustrating the steps for selecting a display format according to the present invention.

FIG. 8 shows a flowchart illustrating the steps of changing the display format in audio system 20. Method 200 commences at step 202. In step 202, processor 26 determines whether DISPLAY/RECALL switch 44, 144 has been actuated and released by the user within a preset duration of time. If so, method 200 continues at step 208. If in step 202 it is determined that display/recall switch 44, 144 has not been actuated and released within the preset duration of time, step 204 will determine whether display/recall switch 44, 144 has been actuated and held by the user for greater than a preset duration of time. If so, step 206 is completed, else method 200 continues at step 202. In step 206, processor 26 stores in data storage 28 the current display format as a default display format. After step 206 is completed, method 200 continues at step 202.

If in step 202 processor 26 determined that display/recall switch 44, 144 was actuated and released within the preset duration of time, then in step 208 processor 26 determines whether additional display pages exist and have not yet been displayed. If so, step 214 is completed. If not, step 210 is completed. In step 214, processor 26 sequences through the additional display pages. After step 214 is completed, method 200 continues at step 202. If in step 208 it is determined that there are no additional display pages which have not yet been displayed, then, in step 210, processor 26 advances the current display format to the next available display format. In step 212, processor 26 determines whether additional pages are available for display. If so, method 200 continues at step 214. If not, method 200 continues at step 202. Method 200 will continue completing step 202 and step 204 until the user actuates DISPLAY/RECALL switch 44, 144.

Referring to FIGS. 3 and 5, when random access media reader 24 has been selected by actuating CD pushbutton 55, TUNE switch 42, 142 is operable for fast track searching of the available audio data files stored on CD 60. To quickly locate and access an audio data file, the user may rotate TUNE switch 42, 142 clockwise 46, 146 to step to the next available audio data file, or counterclockwise 48, 148 to step to the previous available audio data file. As TUNE switch 42, 142 is rotated and the current selection of audio data file or CD 60 changes, display 32, 132 is updated with the track number and filename or track name of the newly selected audio data file.

When TUNE switch 42, 142 is released or movement ceases for more than a preset duration, such as 2 seconds, playback of the currently selected audio data file begins. If TUNE switch 42, 142 is again rotated, display and selection of the current audio data file again changes. Although the exemplary embodiment utilizes rotation of a rotary switch, movement or actuation of other types of switches or sensors may also be used.

Figure 7:
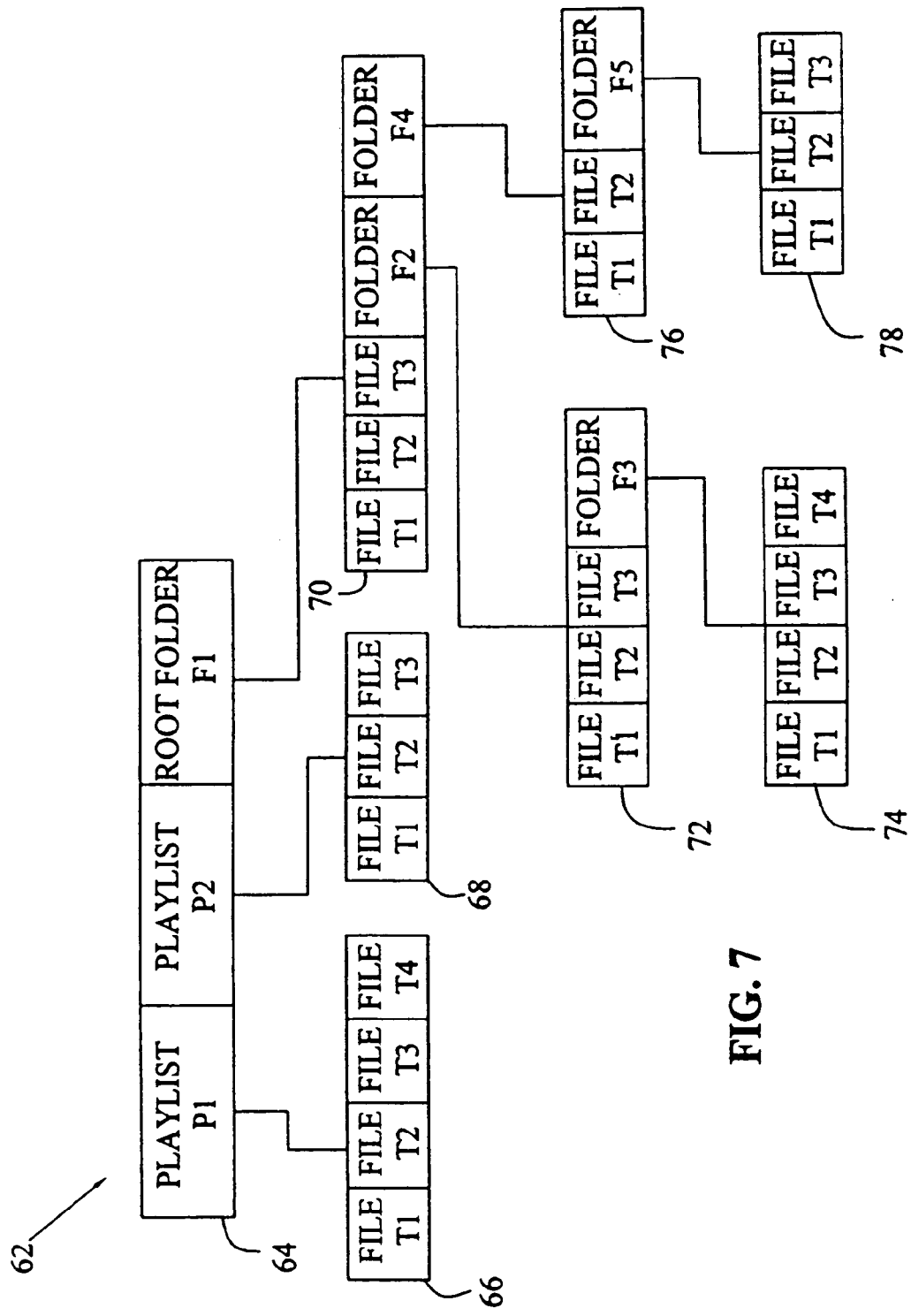
FIG. 7 is a plan view of an exemplary data structure of a first data CD.

Referring now to FIG. 7, an exemplary data structure of first data CD 62 is shown, first data CD 62 includes root directory 64 having playlist P1, playlist P2, and folder F1. Playlist P1 includes four audio data files 66. Playlist P2 includes three audio data files 68. Folder F1 includes three audio data files 70 and folder F2 and folder F4. Thus, folders F2 and F4 are subfolders of folder F1. Folder F2 includes three audio data files 72 and subfolder F3, which includes four audio data files 74. Folder F4 includes two audio data files 76, and subfolder F5, which includes three audio data files 78. The data structure may include any number of audio data files, playlists, and folders. For example, CD 62 could have zero playlists or only Folder F1, which includes the audio data files stored in the root directory.

Data structures such as that shown in FIG. 7 may be created by software applications such as WinAmp™, Music-Match™, and RealJukebox™. Playlists P1 and P2 each provide a list of audio data files, or, more specifically, audio data file pointers or directory locations for audio tracks that are sequentially played back when the user selects the playlist. Folders F1–F5 provide a structure for organizing related audio data files by grouping the files into folders that each relate to a particular artist, album, genre, or other characteristic of the recording stored in the audio data files.

Referring again to FIG. 3, first embodiment of user interface 30 also includes FOLDER DOWN pushbutton 50 and FOLDER UP pushbutton 52 for stepping the selection of playlists and folders. For example, if the current selection is an audio data file in playlist P1, pressing FOLDER UP pushbutton 52 selects and displays track T1 of playlist P2. If playlist P2 is the last playlist in data CD 62, pressing FOLDER UP pushbutton 52 again will select track T1 in folder F1. Additional activations of FOLDER UP pushbutton 52 will continue to select the first track of the next folder until after the last folder, i.e., folder F5, is selected. After the last folder is selected and FOLDER UP pushbutton 52 is again actuated, track T1 of playlist P1 will be selected and display, thus wrapping around not to the first folder F1 but to the first playlist P1. Operation of FOLDER DOWN pushbutton 50 is analogous but in reverse order to FOLDER UP pushbutton 52. For example, actuating FOLDER DOWN pushbutton 50 will select the previous playlist, wrap to the first folder F1, or wrap from the first folder F1 to the first playlist P1. FOLDER UP pushbutton 152 and FOLDER DOWN pushbutton 150 of the second embodiment of user interface 130 may function identical to FOLDER UP pushbutton 52 and FOLDER DOWN pushbutton 50, respectively.

In order to indicate transitions between the various playlists or between the various folders, an audible signal or visual display can be provided whenever user actuation of input devices 40, 140 steps the selection between the playlists or between the folders. Such an indication may also be implemented only when fast track searching is used or also when the FOLDER UP/DOWN pushbuttons 50, 150, 52, 152 are actuated.

TUNE switch 42, 142 and/or FOLDER UP/DOWN 50, 150, 52, 152 pushbuttons may also be operable for stepping between audio data files stored on a standard audio CD, such as those having audio data files in a CDA format. However, with standard audio CDs, song titles may be unavailable and therefore audio system 20 may only display track numbers, for example, as shown in FIGS. 4B and 6B.

Although described in the exemplary embodiments, it will be understood that various modifications may be made to the subject matter without departing from the intended and proper scope of the invention. Accordingly, it will be understood that other audio devices incorporating an embodiment of the audio system and methods device may fall within the scope of this invention, which is defined by the appended claims.

What is claimed is:

1. An audio system comprising an audio receiver; a processor coupled to said audio receiver; a random access media reader coupled to said processor, said processor having software enabling access to audio data files, folders, and playlists on a removable random access media; a display having a plurality of display formats actuateable by said software, each said display format displaying a label associated with an audio data file; and a display switch coupled to said processor and having a first mode in which said display switch causes said software to change said display from one of said plurality of display formats to another one of said plurality of display formats, wherein said software sets a default display format that is selected upon activating the audio system, and said display switch includes a second mode in which said display switch is operable for setting said default display format to one of said plurality of display formats, wherein said plurality of display formats includes a first display format having a single display page and a second display format having a plurality of display pages each displaying a portion of said label; and said display switch includes a third mode in which said display is operable for initiating sequential displaying of said plurality of display pages of said second display format.

2. The audio system of claim 1, wherein said label includes at least one of a file name of said audio data file and a track name of an audio recording stored in said audio data file.

3. The audio system of claim 2, wherein said track name includes data from an ID3 tag information field associated with said audio data file.

4. The audio system of claim 2, wherein said plurality of display formats includes a format having a first field displaying a track number associated with said audio data file and a second field displaying said at least one of said file name and said track name.

5. The audio system of claim 2, wherein said plurality of display formats includes a format having a first field displaying at least one of a folder number and a playlist number and a second field displaying at least one of a folder name and a playlist name, wherein said folder and playlist number and said folder and playlist names are associated with said audio data file.

6. The audio system of claim 2, wherein said plurality of display formats includes a format having a first field displaying the time of day and a second field displaying said at least one of said file name and said track name.

7. The audio system of claim 1, wherein said first mode is selected by actuating and releasing said display switch within a duration of preset time.

8. The audio system of claim 7, wherein said preset duration of time is 2 seconds.

9. The audio system of claim 1, wherein said second mode is selected upon an actuation of said display switch having a duration of greater than a preset time.

10. The audio system of claim 9, wherein said preset time is 2 seconds.

11. The audio system of claim 1, wherein said first mode is selected upon a first actuation and release of said display switch when said first display format is in use; said third mode is selected upon a first actuation and release of said display switch when said second display format is in use; and said first mode is selected upon a second actuation and release of said display switch when said second display format is in use.

12. A method of changing the display of audio data file information in an audio system including an audio receiver having a radio tuner, a random access media reader adapted to access the audio data files, and a user interface, including a display, comprising the steps of:
provided a plurality of display formats for said display; said display formats including information associated with the audio data files;
displaying a first display format, on the display;
receiving a first user input from the user interface; and
altering the display to a second display format upon-said receiving the first user input, and
receiving a second user input and, in response to said second user input, storing the second display format as a default display format, wherein the display includes a plurality of display formats and said step of altering the display of information includes the step of advancing the display of information from one of the plurality of display formats to another of the plurality of display formats, wherein the plurality of display formats includes a first display format having a single display page and a second display format having a plurality of display pages each displaying a portion of the information, and said step of altering the display of information includes the step of displaying another one of the plurality of display pages of the second display format when the second display format is in use.

13. The method of claim 12, wherein said step of advancing the display of information is completed upon a first occurrence of receiving a user input when the first display format is in use; said step of displaying another one of the plurality of display pages of information is completed upon a first occurrence of receiving a user input when said second display format is in use; and said step of advancing the display of information is completed upon a second occurrence of receiving a user input when said second display format is in use.

14. The method of claim 12, wherein said step of receiving a user input includes actuating and releasing a switch within a preset duration of time.

15. The method of claim 12, wherein said step of receiving a user input includes actuating a switch for a duration of greater than a preset time.

16. An audio system including an audio receiver having a radio tuner, a random access media reader capable of accessing audio data files, comprising a processor coupling the audio receiver and the random access media reader, a user interface coupled to the processor and having a switch and a display, and software enabling said processor to:
display, on said display, information associated with the audio data file using one of a plurality of display formats each said display format displaying a label associated with an audio data file;
receive a first signal from said switch; and,
upon receiving said first signal, change said display of information from said one of said plurality of display formats to another of said plurality of display formats; and
receive a second signal from said switch; and, upon receiving said second signal, store the display format currently used for said display of information as a default display format, wherein said plurality of display formats includes a first display format having a single display page and a second display format having a plurality of display pages each displaying a portion of said label; and said switch includes a mode in which said display is operable for initiating sequential displaying of said plurality of display pages of said second display format.

17. The audio system of claim 16, wherein said first signal is received upon actuating and releasing said switch within a preset duration of time and said second signal is received upon actuating and holding said switch for at least a preset duration of time.

* * * * *